(12) United States Patent
Talwar et al.

(10) Patent No.: US 9,125,101 B2
(45) Date of Patent: Sep. 1, 2015

(54) DISTRIBUTED POWER CONTROL FOR D2D COMMUNICATIONS

(71) Applicants: Shilpa Talwar, Los Altos, CA (US); Namyoon Lee, Austin, TX (US)

(72) Inventors: Shilpa Talwar, Los Altos, CA (US); Namyoon Lee, Austin, TX (US)

(73) Assignee: Intel Corporation, Santa Clara, CA (US)

(*) Notice: Subject to any disclaimer, the term of this patent is extended or adjusted under 35 U.S.C. 154(b) by 181 days.

(21) Appl. No.: 13/790,533

(22) Filed: Mar. 8, 2013

(65) Prior Publication Data

US 2014/0254401 A1 Sep. 11, 2014

(51) Int. Cl.
 *H04B 7/00* (2006.01)
 *H04W 24/10* (2009.01)

(52) U.S. Cl.
 CPC ............................. *H04W 24/10* (2013.01)

(58) Field of Classification Search
 USPC ............... 370/248, 252, 328, 329, 330, 336; 455/522
 See application file for complete search history.

(56) References Cited

U.S. PATENT DOCUMENTS

| | | | |
|---|---|---|---|
| 8,111,709 B2 * | 2/2012 | Hunukumbure et al. ...... 370/437 |
| 2009/0325625 A1 * | 12/2009 | Hugl et al. ................. 455/522 |
| 2010/0189046 A1 | 7/2010 | Baker et al. |
| 2010/0254280 A1 | 10/2010 | Jamadagni et al. |
| 2010/0261469 A1 * | 10/2010 | Ribeiro et al. ............. 455/423 |
| 2011/0064072 A1 | 3/2011 | Wang et al. |
| 2011/0243010 A1 * | 10/2011 | Geirhofer et al. ........... 370/252 |
| 2011/0275382 A1 * | 11/2011 | Hakola et al. ............. 455/452.2 |
| 2012/0044815 A1 * | 2/2012 | Geirhofer et al. ........... 370/248 |
| 2012/0106372 A1 * | 5/2012 | Gaal et al. ................... 370/252 |
| 2012/0322484 A1 * | 12/2012 | Yu et al. ...................... 455/509 |
| 2013/0230032 A1 * | 9/2013 | Lu et al. ...................... 370/336 |
| 2013/0272262 A1 * | 10/2013 | Li et al. ........................ 370/330 |
| 2014/0057670 A1 * | 2/2014 | Lim et al. ..................... 455/509 |

FOREIGN PATENT DOCUMENTS

| | | | |
|---|---|---|---|
| CN | WO2012049351 A1 * | 4/2012 |
| KR | WO2012/150815 A2 * | 11/2012 |
| WO | WO-2010082084 A1 | 7/2010 |
| WO | WO-2011112132 A1 | 9/2011 |
| WO | WO-2014138189 A1 | 9/2014 |

OTHER PUBLICATIONS

"International Application Serial No. PCT/US2014/020627, International Search Report mailed Jun. 19, 2014", 4 pgs.
"International Application Serial No. PCT/US2014/020627, Written Opinion mailed Jun. 19, 2014", 7 pgs.

* cited by examiner

*Primary Examiner* — Kevin C Harper
(74) *Attorney, Agent, or Firm* — Schwegman Lundberg & Woessner, P.A.

(57) ABSTRACT

A technique for setting the transmission powers of individual D2D (device-to-device) transmitters using a distributed power control technique is described. Each individual D2D transmitter learns the interference levels that it imposes on an eNB (evolved Node B) and on D2D receivers other than its partner D2D receiver. The D2D transmitter is then able to adjust its transmission power accordingly. Such managing of interference temperature via distributed power control enables the network to maximize its reuse of time-frequency resources.

25 Claims, 5 Drawing Sheets

DISTRIBUTED POWER CONTROL FOR D2D COMMUNICATIONS

BACKGROUND

Device-to-device (D2D) communications is one means for improving the performance of LTE (Long Term Evolution) and other cellular networks. In D2D communications, terminals (referred to as user equipments or UEs in LTE) communicate with one another directly rather than being linked through the base station (referred to as an evolved node B or eNB in LTE). D2D communication between two or more D2D devices is typically very local, due to the short distance between D2D devices and uses very lower transmit power. D2D communications is also an effective way to increase spatial reuse of resources in cellular systems for higher throughput.

One approach to D2D communications as an underlay to an LTE network infrastructure is an out-of-band solution, in which the D2D traffic is unloaded to an unlicensed band (e.g., Wi-Fi as defined by the IEEE 802.11 standards) on the application layer. Another approach is an in-band solution, in which the D2D transmissions take place in the same licensed band used by the LTE network. In the latter approach, managing the interference caused by D2D transmissions becomes a significant problem.

BRIEF DESCRIPTION OF THE DRAWINGS

FIG. 1 shows example UE devices for D2D communications and an eNB.

FIG. 2 illustrates an embodiment for distributed power control.

FIG. 3 illustrates the transmissions of sounding signals during the first time slot.

FIG. 4 illustrates the transmissions of reverse sounding signals during the second time slot.

FIG. 5 depicts the allocation of measurement time-frequency resources transmitting the sounding signals and reverse sounding signals.

DETAILED DESCRIPTION

The following description and the drawings sufficiently illustrate specific embodiments to enable those skilled in the art to practice them. Other embodiments may incorporate structural, electrical, process, and other changes. Portions and features of some embodiments may be included in, or substituted for, those of other embodiments. Embodiments set forth in the claims encompass all available equivalents of those claims.

D2D communications as an underlay to an LTE or other cellular network may be implemented in the licensed band with separate orthogonal resources allocated to each D2D session. In that case, the D2D devices produce no interference. When the available resources are such that non-orthogonal resources are shared between multiple D2D communications sessions and shared with the cellular network, however, a D2D transmission may interfere with the transmissions of other D2D transmitters and with communications between cellular UEs and the eNB, the latter being confined to cellular UE transmissions to the eNB if only uplink resources are allocated for D2D communications. One way to deal with this problem is to control the transmit power of the D2D devices in a manner such that their transmission power levels are adequate to maintain the D2D links hut not high enough to cause unacceptable interference to other receivers in the network In an LTE network underlain with D2D communications, the eNB may define what constitutes an acceptable level of interference, or interference temperature, for itself in receiving communications from cellular UEs and for each D2D receiver. For the eNB to control the transmission power level of each D2D transmitter so as to not to exceed these interference temperature limits, however, would be a burdensome task. Described herein is a technique for setting the transmission powers of D2D transmitters using a distributed power control technique in which each D2D transmitter learns the interference levels that it imposes on the eNB and on D2D receivers other than its partner D2D receiver. The D2D transmitter is then able to adjust its transmission power accordingly. Such managing of interference temperature via distributed power control enables the network to maximize its reuse of time-frequency resources.

System Description

FIG. 1 shows an example of a UE D1 and a UE D2, each of which incorporates a processor 21 interfaced to a radio-frequency (RF) transceiving circuitry 22 that is connected to one or more antennas 23. A base station or eNB 40 is shown with a processor 41 interfaced to an RF transceiving circuitry 42 that is connected to a plurality of antennas 43. The illustrated components are intended to represent any type of hardware/software configuration for providing a air interfaces for both LTE and D2D communication and for performing the processing functions as described herein. In the embodiment shown in the figure, UEs D1 and D2 both communicate with the eNB 40 via LTE links and with one another via D2D link.

The physical layer of LTE is based upon orthogonal frequency division multiplexing (OFDM) for the downlink and a related technique, single carrier frequency division multiplexing (SC-FDM), for the uplink. In OFDM/SC-FDM, complex modulation symbols according to a modulation scheme such as QAM (quadrature amplitude modulation) are each individually mapped to a particular OFDM/SC-FDM subcarrier transmitted during an OFDM/SC-FDM symbol, referred to as a resource element (RE). An RE is the smallest time-frequency resource in LTE. LTE transmissions in the time domain are organized into radio frames, each having a duration of 10 ms. Each radio frame consists of 10 sub-frames, and each sub-frame consists of two consecutive 0.5 ms slots. Each slot comprises six indexed OFDM symbols for an extended cyclic prefix and seven indexed OFDM symbols for a normal cyclic prefix. A group of resource elements corresponding to twelve consecutive subcarriers within a single slot is referred to as a resource block (RB) or, with reference to the physical layer, a physical resource block (PRB). In TDD (time division duplex) operation as opposed to FDD (frequency division duplex) operation, subframes are allocated for either uplink or downlink transmission with a special subframe occurring at the transition from downlink to uplink transmission (but not at the transition from uplink to downlink transmission).

Distributed Power Control Schemes

A power control scheme as described below decides the transmit power to used by D2D transmitter devices based on distributed network interference pattern learning. To obtain knowledge of the interference pattern in a distributed manner, D2D transmitters and receivers send sounding signals using two orthogonal time slots. The sounding signals are measured at the both the receiver and transmitter sides, allowing the D2D transmitter devices to acquire the network interference pattern implicitly. Each D2D transmitter device can decide the transmit power such that the nearest D2D receiver and the base station do not receive the interference power beyond a certain level called the interference temperature. The technique has the advantages of: 1) improving the network throughput owing to increased spatial reuse for D2D communication in the cellular network, and 2) ensuring quality of service (QoS) of active cellular users in uplink by protecting them from harsh interference created by active D2D links.

Figure 1:
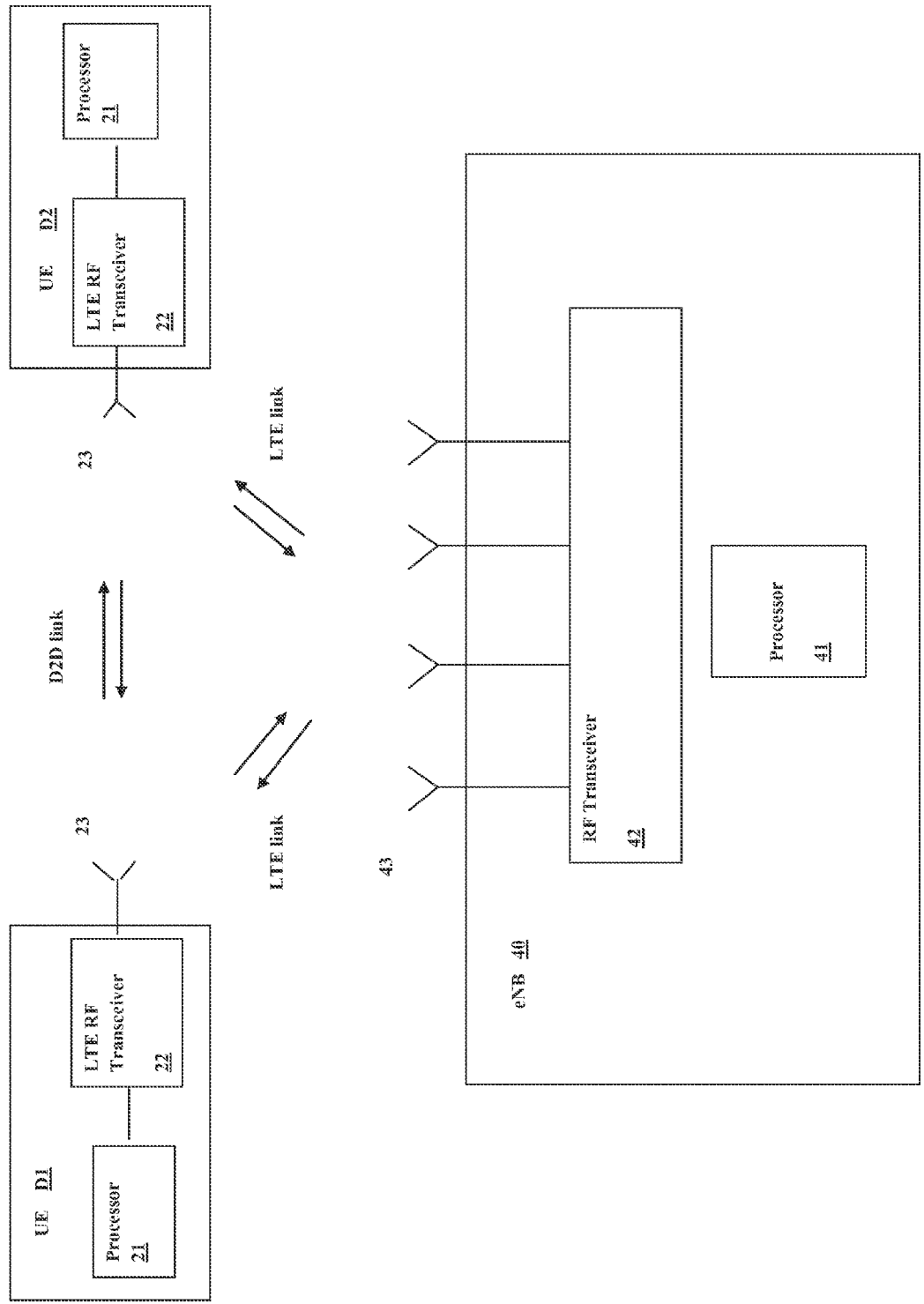
Figure 2:
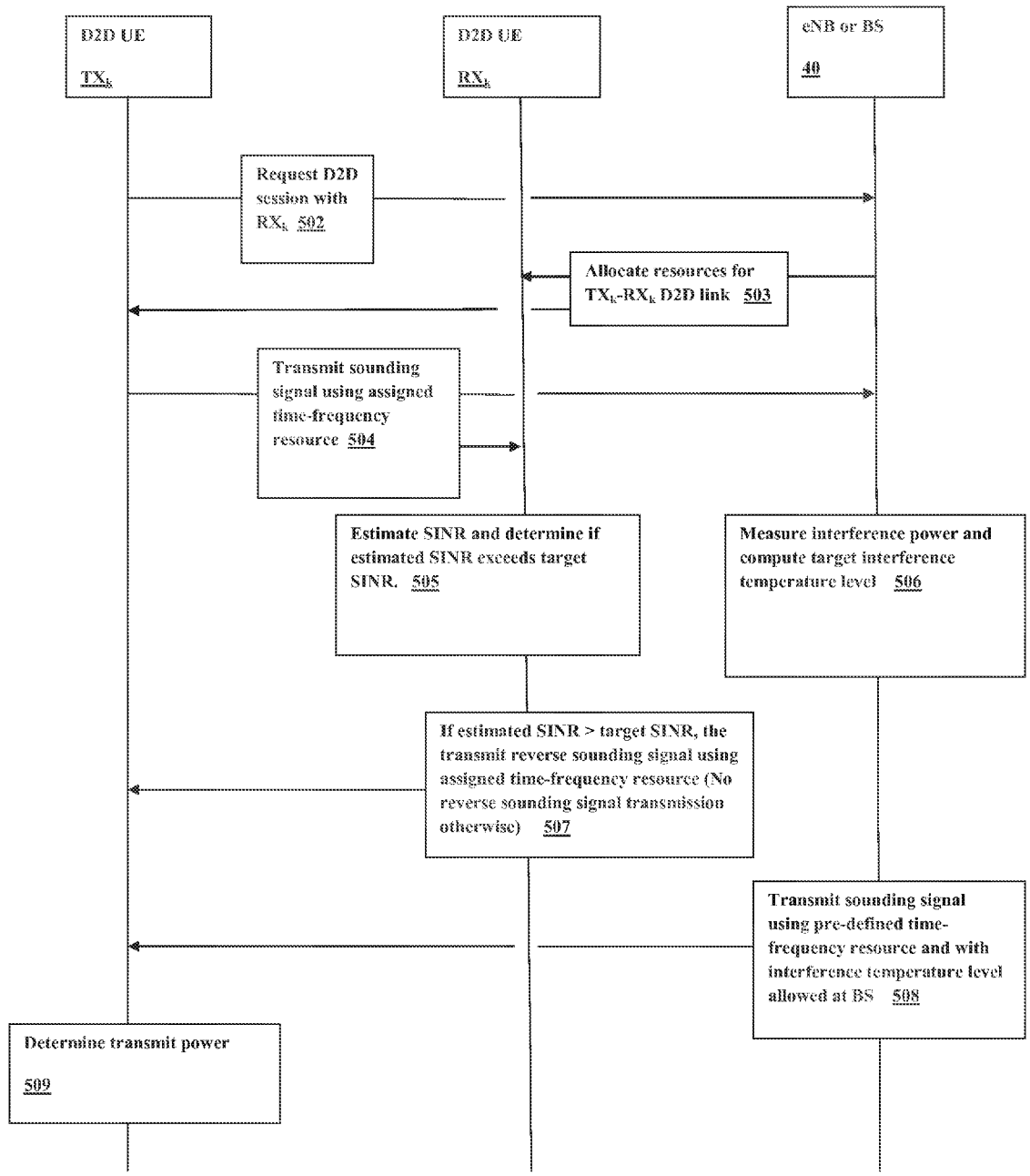

An embodiment for distributed power control is illustrated by FIG. 2 which shows and eNB or BS 40 and two UEs that are to be a D2D pair, designated as a D2D transmitter $TX_k$ and a D2D receiver $RX_k$, where k=1 through N and N is the total number of D2D pairs. The technique may be described as comprising three phases: a D2D link establishment phase, a network interference pattern learning phase, and a power control phase. The D2D link establishment phase begins at step 502 where $TX_k$ requests the eNB for D2D resources, which resources are allocated to the $TX_k$-$RX_k$ pair at step 503. A D2D link is thus established for each of the N D2D pairs, $TX_k$-$RX_k$. The eNB also allocates a set of measurement time-frequency resources with one such measurement time-frequency resource allocated to each D2D pair. The measurement time-frequency resources may be orthogonal to one another and in a control channel, and each measurement time-frequency resource may correspond to a resource element or a group of resource elements.

During the network interference pattern learning phase, each D2D transmitter $TX_k$ of a D2D pair sends at step 504 a sounding signal at a specified power level in a first time slot using its allocated time-frequency resource. The specified power level may be $P_{max}$, the maximum power level, or some initial power level $P_1$ which is set for the system in the link establishment phase based on the expected range of D2D communication. Each corresponding D2D receiver $RX_k$ of the pair then estimates the SINR (signal-to-noise-plus-interference ratio) of the received signal at step 505. The sounding signals sent by transmitters $TX_k$ during the first time slot are also received by the eNB which measures the total interference and computes a target interference temperature level at step 506. If the SINR at a D2D receiver exceeds a threshold indicating that the forward link is adequate, then the D2D receiver device transmits a reverse sounding signal at a specified power level using the same allocated time-frequency resource but in a second time slot, orthogonal to the first time slot, at step 507.

If the D2D transmitter detects a sounding signal in its allocated time-frequency resource during the second time slot, it then knows that the quality of the D2D link with its D2D partner device is adequate at the current transmit power level. The D2D receiver may encode information in the time-frequency resource of the reverse sounding signal sent during the second slot, such as the SINR of the signal received during the first time slot. Also during the second time slot, the D2D transmitter receives reverse sounding signals sent by D2D receivers belonging to other D2D pairs using their allocated time-frequency resources. By measuring the signal power in those time-frequency resources, each D2D transmitter, due to channel reciprocity, learns the interference its transmissions would impose on D2D receivers of other D2D pairs were time-frequency resources to be shared with those D2D pairs.

The eNB may also send at step 508 a sounding signal in the second time slot using a time-frequency resource orthogonal to those allocated to the D2D pairs. The D2D transmitter thus also learns the interference that its transmissions would impose upon the eNB were its D2D resources to be shared with cellular uplink transmissions. After learning the network interference pattern, at step 509, each D2D transmitter device may then decide its transmit power so that the selected transmit power satisfies both the SINR required by its paired D2D receiver and the interference temperature levels seen by the nearest D2D receiver device other than its paired receiver and the eNB.

Figure 3:
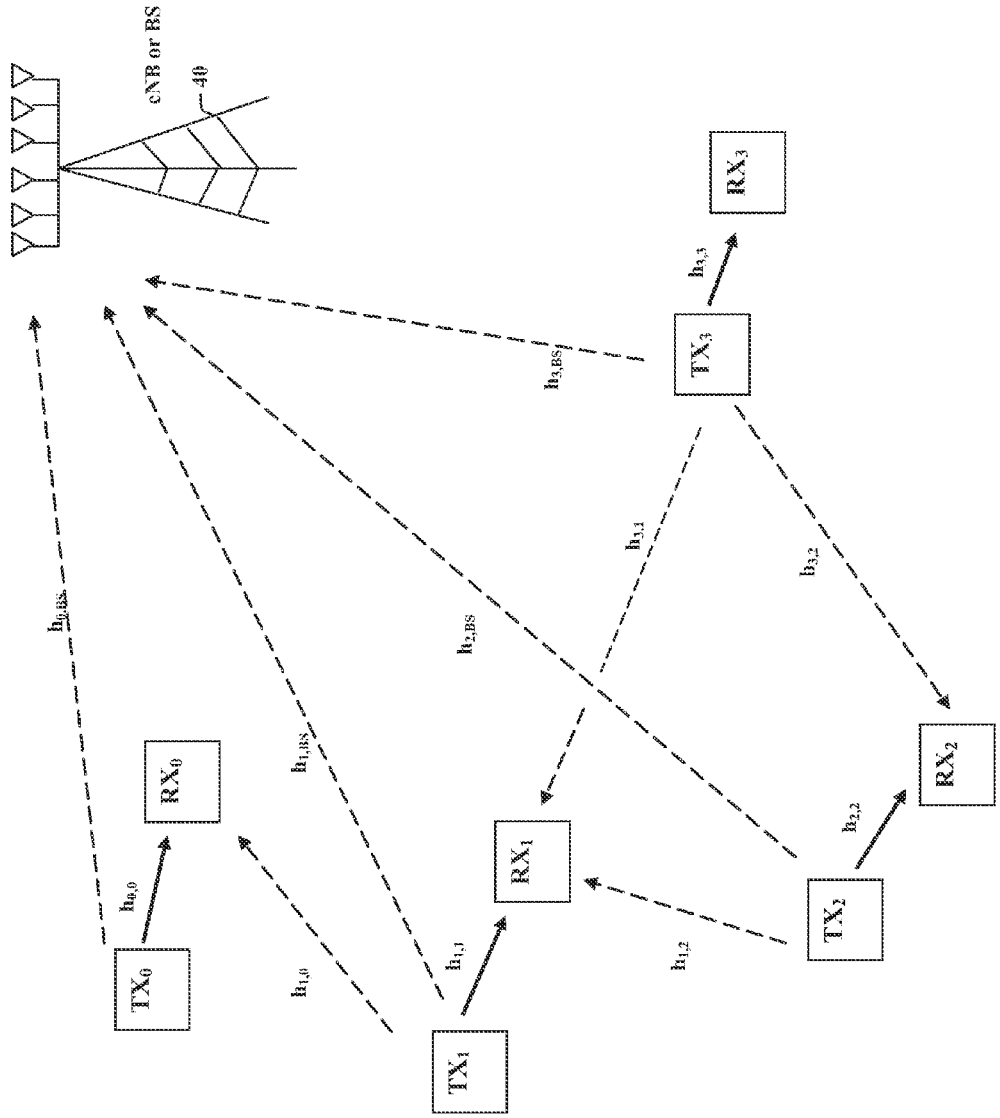
Figure 4:
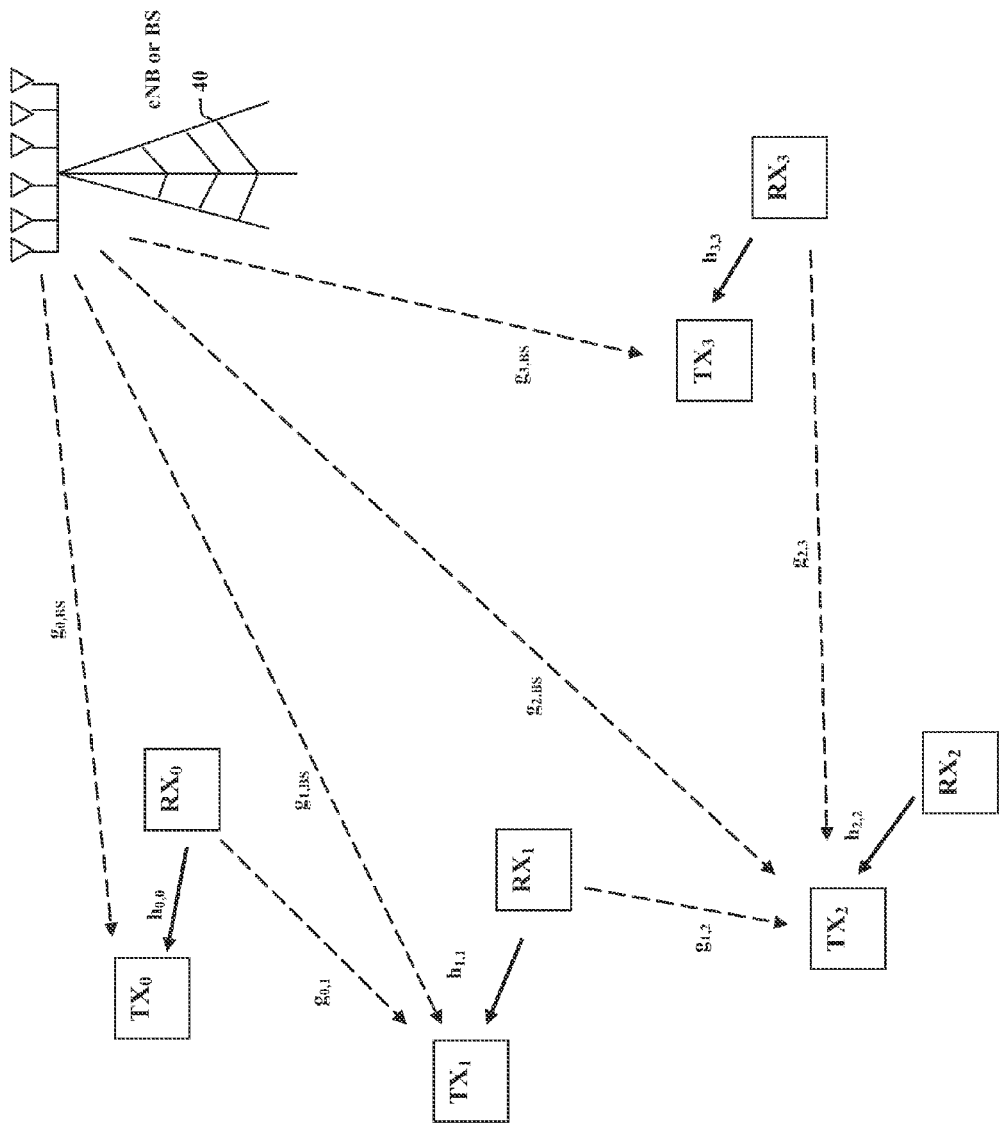

A specific example of the distributed power control scheme as described above is illustrated by FIGS. 3 through 5. FIGS. 3 and 4 each show an arrangement of four D2D pairs made up of a D2D transmitter $TX_k$ and a D2D receiver $RX_n$, for k=0 through 3, for n=0 through 3 and an eNB 40. FIG. 3 show the transmissions during the first time slot, while FIG. 4 shows the transmissions that occur during the second time slot. After establishment of the D2D links for each of the pairs, each transmitter $TX_k$ transmits a sounding signal using its predefined control channel time-frequency resource during the first time slot as shown in FIG. 3. As shown in FIG. 3, each receiver $RX_n$ receives the sounding signal from its D2D partner as well as sounding signals transmitted by other D2D transmitters. The channel gains between each transmitter and receiver is designated as $h_{n,k}$ for $TX_k$=0 to 3 and $RX_n$=0 to 3. The eNB also receives the sounding signals sent by the transmitters during the first time slot with channel gains designated as $h_{BS,k}$ for k=0 to 3. From the sounding signal, all D2D receivers and the eNB compute an estimated SINR and decide whether or not they respond by sending a reverse sounding signal using the same time-frequency resource during the second time slot as illustrated by FIG. 4. During the second time slot, all the D2D receiver devices broadcast their reverse sounding signal using the same time-frequency resource used in the first time slot to receive the sounding signal sent by their D2D partner transmitter, provided the estimated SINR exceeds a target SINR. Also during the second time slot, the eNB may also broadcast a sounding signal using a time-frequency resource orthogonal to those used by the D2D transmitters and receivers. The eNB's sounding signal may also contain interference temperature level information for use by the D2D transmitters in deciding their transmit power. During the second time slot, each D2D transmitter $TX_k$ receives the sounding signal transmitted by its partner D2D receiver $RX_n$ (n=k) with a channel gain of $h_{k,k}$ in its assigned time-frequency resource and may also receive the sounding signals sent by non-partner D2D receivers with a channel gain of $g_{k,n}$ for k,n=0 to 3 and n≠k in the time-frequency resources assigned to those D2D pairs. Each D2D transmitter $TX_k$ also receives the sounding signal transmitted by the eNB during the second time slot with a channel gain of of $g_{k,BS}$ for k=0 to 3.

Figure 5:
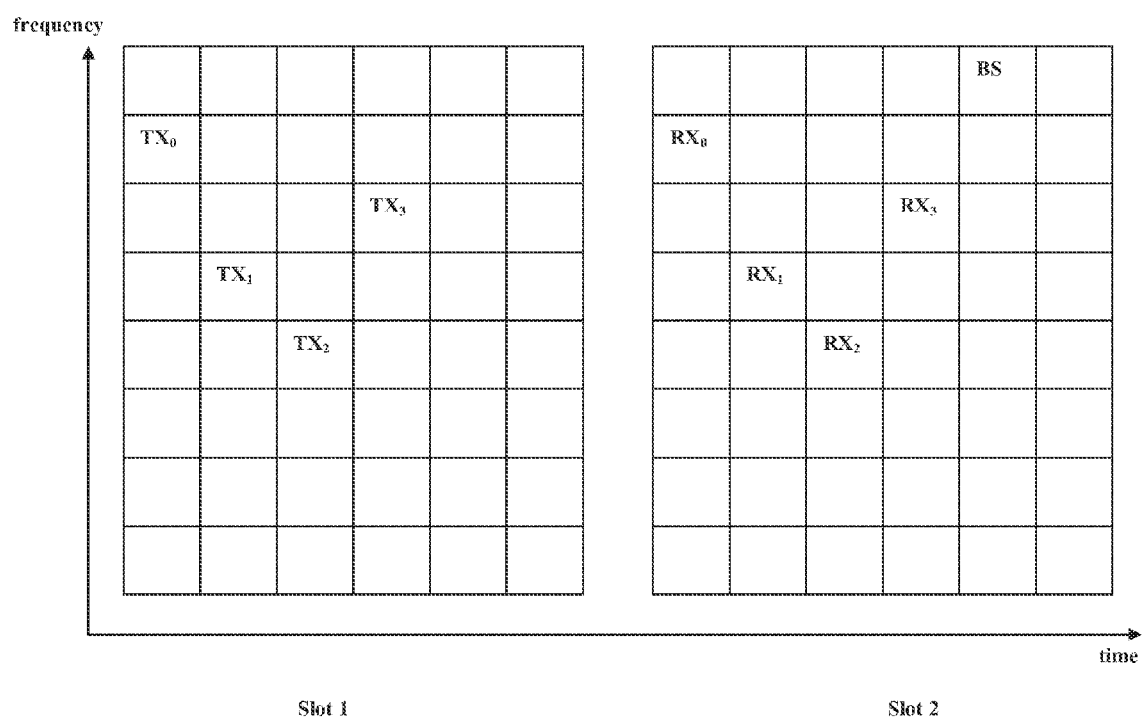

FIG. 5 illustrates an example of the predefined measurement time-frequency resources allocated by the eNB to the D2D pairs for transmitting the sounding signals during the first time slot and the reverse sounding signals during the second time slot. Shown in the figure are resource elements belonging to a first slot and a second slot. The first and second slots may be contiguous so as to constitute an LTE subframe or may be located in different subframes. In this example, each of predefined orthogonal time-frequency resources corresponds to a single resource element assigned to $TX_k$ in the first time slot and $RX_n$ in the second time slot for k,n=0 to 3. A resource element is also assigned to the eNB or BS in the second time slot as shown in the figure for transmitting the eNB's sounding signal.

After learning the network interference pattern, each D2D transmitter device decides the transmit power it needs to use for the data session. One method that may be used is to select the power in a manner that meets interference temperature constraints for both the nearest non-paired D2D receivers and the eNB simultaneously. For example, each D2D transmitter $TX_k$ may set its transmit power $P_0$ according to the following equation:

$P_0 = \min\{T_{eNB}/g_{k,BS}, \min\{T_{D2D}/g_{k,j}\}, P_{max}\}$ for $k \neq j$ where $T_{eNB}$ and $T_{D2D}$ are the interference temperature limits at the eNB and non-paired D2D receiver, respectively. $T_{eNB}$ and $T_{D2D}$ may be predefined values or may be computed by the eNB and transmitted to the D2D transmitters. Setting the transmit power to $P_0$ may be also conditioned upon the calculated transmit power being high enough so that the SINR for signals received by the partner D2D receiver $RX_k$ exceeds some specified threshold, such as some minimum SINR target that can support a lowest modulation/coding scheme The partner D2D receiver $RX_k$ may transmit its estimated SINR for the sounding signal received by it during the first time slot to the transmitter $TX_k$ during the second time slot as part of the reverse sounding signal. The transmitter $TX_k$ may use that estimated SINR along with the known power level of the sounding signal that it transmitted to its receiver $RX_k$ to decide whether the calculated transmit power $P_0$ is sufficient to maintain an adequate SINR.

Example Embodiments

Descriptions of example embodiments of a UE or method for operating same are as follows. In one embodiment, a UE comprises a radio transceiver to provide an air interface for communicating with an eNB and for D2D communications and further comprises processing circuitry connected to the radio transceiver to receive allocations of time-frequency resources for D2D communications from the eNB and to establish a D2D communications session with a second UE over a D2D link. The processing circuitry may be further to receive from the eNB an assigned measurement time-frequency resource for, when acting as a D2D transmitter, transmitting in a first time slot a sounding signal to the second UE acting as a D2D receiver. The processing circuitry may be further to, when acting as a D2D receiver, receive a sounding signal from the second UE acting as a D2D transmitter over the assigned measurement time-frequency resource in the first time slot, and, if the signal quality of the sounding signal received from the second UE meets a specified threshold, transmit a reverse sounding signal to the second UE in a second time slot using the same assigned measurement time-frequency resource. The processing circuitry may be further to, if the second UE responds in a second time slot with a reverse sounding signal transmitted over the same assigned measurement time-frequency resource used to transmit the sounding signal to the second UE, determine that the signal quality of the D2D link is adequate. The processing circuitry may be further to measure the signal power of the reverse sounding signal received from the second UE and adjust a signal power used to transmit to the second UE in accordance therewith. The processing circuitry may be further to receive from the eNB an allocation of measurement time-frequency resources that are orthogonal to the assigned measurement time-frequency resource and which are assigned to other D2D pairs. The processing circuitry may be further to, when acting as a D2D receiver and transmitting the reverse sounding signal to the second UE in the second time slot, maintain zero transmission power in the allocated measurement time-frequency resources assigned to other D2D pairs. The processing circuitry may be further to: measure the signal powers of reverse sounding signals from other UEs that are received in the measurement time-frequency resources assigned to other D2D pairs in the second time slot; and measure the signal power of a sounding signal received from the eNB during the second time slot using a time-frequency resource orthogonal to the assigned measurement time-frequency resource and to the measurement time-frequency resources assigned to other D2D pairs. The processing circuitry may be further to adjust the transmit power used to transmit to the second UE in relation to the signal powers of the signals received from other UEs and the eNB during the second time slot. The processing circuitry may be further to adjust the transmit power used to transmit to the second UE in a manner that maintains a specified signal to noise and interference ratio (SINR) and minimizes interference to the eNB and a nearest other UE as determined from the measured signal powers from the other UEs and the eNB during the second time slot. The processing circuitry may be further to adjust the transmit power used to transmit to the second UE to meet a specified interference temperature constraint. The processing circuitry may be further to receive the specified interference temperature constraint via the sounding signal received from the eNB during the second time slot. The processing circuitry may be further to set the transmit power as a function of interference temperature constraints for the eNB and the nearest other UE as received from the eNB.

Descriptions of examples of an eNB or method for operating same are as follows. In one embodiment, an eNB is operated by allocating time-frequency resources for D2D communications to a plurality of D2D pairs, wherein each D2D pair comprises first and second member UEs; assigning a measurement time-frequency resource to each of the D2D pairs for use in measuring signal power; assigning a first time slot for use by the first member of each D2D pair to transmit a sounding signal to the second member using the assigned measurement time-frequency resource; and, assigning a second time slot for use by the second member of each D2D pair to transmit a reverse sounding signal to a first member using the assigned measurement time-frequency resource; and, configuring the second member of the each D2D pair to transmit the reverse sounding signal in the second time slot only if the sounding signal is received from the first member with a SINR (signal-to-noise-plus-interference ratio) above a specified target value. The eNB operation may further comprise configuring the first member of each D2D pair to transmit the sounding signal during the first time slot at a specified power level. The specified power level may be a maximum power level or an initial power level which is set for the system in the link establishment phase based on the expected range of D2D communication. The assigned measurement time-frequency resources assigned to the UE pairs may be orthogonal to one another and may each constitute a single resource element. The first and second time slots may be contiguous and constitute an LTE subframe or may be non-continuous in different LTE (Long Term Evolution) subframes. The eNB operation may further comprise configuring the first member of each D2D pair to measure, in the second time slot, the signal powers of reverse sounding signals received in the measurement time-frequency resources assigned to other D2D pairs. The eNB operation may further comprise configuring the first member of each D2D pair to adjust the transmit power used to transmit to the second member in relation to the signal powers of the signals received in the measurement time-frequency resources assigned to other D2D pairs during the second time slot. The eNB operation may further comprise broadcasting a sounding signal during the second time slot using a time-frequency resource orthogonal to the assigned measurement time-frequency resources and configuring the first member of each D2D pair to adjust the transmit power used to transmit to the second member in relation to the signal powers of the signals received in the measurement time-frequency resources assigned to other D2D pairs during the second time slot and the sounding signal received from the eNB during the second time slot. The eNB's sounding signal may also contain interference temperature level information for use by the D2D transmitters in deciding their transmit power.

The embodiments as described above may be implemented as methods for operation and/or in various hardware configurations that may include a processor for executing instructions that perform the methods. Such instructions may be contained in a suitable storage medium from which they are transferred to a memory or other processor-executable medium.

The subject matter has been described in the context of an LTE network. Except where inconsistencies would arise, the subject matter could be used in other types of cellular networks with references to a UE and eNB replaced by references to a terminal and base station, respectively.

The subject matter has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment (UE) device, comprising:
a radio transceiver to provide an air interface for communicating with an evolved node B (eNB) and for device-to-device (D2D) communications; and
processing circuitry connected to the radio transceiver to:
receive allocations of time-frequency resources for D2D communications from the eNB and establish a D2D communications session with a second UE over a D2D link;
receive from the eNB an assigned measurement time-frequency resource;
when acting as a D2D transmitter, transmit in a first time slot using the assigned measurement time-frequency resource a sounding signal at a specified power level to the second UE acting as a D2D receiver;
receive a reverse sounding signal from the second UE transmitted in a second time slot using the assigned measurement time-frequency resource, wherein the reverse sounding signal has encoded within it an SINR (signal-to-noise-plus-interference ratio) of the signal received by the second UE during the first time slot;
receive reverse sounding signals sent by one or more D2D receivers belonging to other D2D pairs in the second time slot using their allocated time-frequency resources and measure the signal power in those time-frequency resources in order to determine the interference that would be imposed on the one or more D2D receivers of other D2D pairs were time-frequency resources to be shared with those D2D pairs;
calculate a transmit power level for D2D communications with the second UE that satisfies an SINR required by the second UE and does not impose interference on the one or more D2D receivers of other D2D pairs above a specified threshold.

2. The device of claim 1 wherein the processing circuitry is further to, when acting as a D2D receiver, receive a sounding signal from the second UE acting as a D2D transmitter over the assigned measurement time-frequency resource in the first time slot, and, if the signal quality of the sounding signal received from the second UE meets a specified threshold, transmit a reverse sounding signal to the second UE in the second time slot using the assigned measurement time-frequency resource.

3. The device of claim 2 wherein the processing circuitry is further to receive from the eNB an allocation of measurement time-frequency resources that are orthogonal to the assigned measurement time-frequency resource and which are assigned to other D2D pairs.

4. The device of claim 3 wherein the processing circuitry is further to, when acting as a D2D receiver and transmitting the reverse sounding signal to the second UE in the second time slot, maintain zero transmission power in the allocated measurement time-frequency resources assigned to other D2D pairs.

5. The device of claim 1 wherein the processing circuitry is further to:
measure the signal power of a sounding signal received from the eNB during the second time slot using a time-frequency resource orthogonal to the assigned measurement time-frequency resource and to the measurement time-frequency resources assigned to other D2D pairs.

6. The device of claim 5 wherein the processing circuitry is further to adjust the transmit power used to transmit to the second UE in relation to the signal powers of the signals received from other UEs and the eNB during the second time slot.

7. The device of claim 6 wherein the processing circuitry is further to adjust the transmit power used to transmit to the second UE in a manner that maintains a specified signal to noise and interference ratio (SINR) and minimizes interference to the eNB and a nearest other UE as determined from the measured signal powers from the other UEs and the eNB during the second time slot.

8. The device of claim 6 wherein the processing circuitry is further to adjust the transmit power used to transmit to the second UE to meet a specified interference temperature constraint.

9. The device of claim 8 wherein the processing circuitry is further to receive the specified interference temperature constraint via the sounding signal received from the eNB during the second time slot.

10. The device of claim 8 wherein the processing circuitry is further to set the transmit power as a function of interference temperature constraints for the eNB and the nearest other UE as received from the eNB.

11. A method for operating an eNB (evolved Node B), comprising:
allocating time-frequency resources for D2D (device-to-device) communications to a plurality of D2D pairs, wherein each D2D pair comprises first and second member UEs user equipments);
assigning a measurement time-frequency resource to each of the D2D pairs for use in measuring signal power;
assigning a first time slot for use by the first member of each D2D pair to transmit a sounding signal to the second member using the assigned measurement time-frequency resource; and,
assigning a second time slot for use by the second member of each D2D pair to transmit a reverse sounding signal to a first member using the assigned measurement time-frequency resource;
configuring the second member of each D2D pair to transmit the reverse sounding signal in the second time slot if the sounding signal is received from the first member with a SINR (signal-to-noise-plus-interference ratio) above a specified target value;

configuring the first member of each D2D pair to measure in the second time slot, the signal powers of reverse sounding signals received in the measurement time-frequency resources assigned to one or more other D2D pairs; and configuring the first member of each D2D pair to adjust the transmit power used to transmit to the second member in relation to the signal powers of the signals received in the measurement time-frequency resources assigned to other D2D pairs during the second time slot.

12. The method of claim 11 further comprising configuring the first member of each D2D pair to transmit the sounding signal during the first time slot at a specified power level.

13. The method of claim 12 wherein the specified power level is a maximum power level.

14. The method of claim 11 wherein the assigned measurement time-frequency resources assigned to the UE pairs are orthogonal to one another.

15. The method of claim 11 wherein the assigned measurement time-frequency resources assigned to the D2D pairs each constitutes a single resource element.

16. The method of claim 11 wherein the first and second time slots are contiguous and constitute an LTE (Long Term Evolution) subframe.

17. The method of claim 11 wherein the first and second time slots are in different LTE (Long Term Evolution) subframes.

18. The method of claim 11 further comprising configuring the first member of each D2D pair to adjust the transmit power used to transmit to the second UE to meet a specified interference temperature constraint.

19. The method of claim 18 further comprising transmitting the specified interference temperature constraint to the first member of each D2D pair via the sounding signal during the second time slot.

20. The method of claim 11 further comprising broadcasting a sounding signal during the second time slot using a time-frequency resource orthogonal to the assigned measurement time-frequency resources and configuring the first member of each D2D pair to adjust the transmit power used to transmit to the second member in relation to the signal powers of the signals received in the measurement time-frequency resources assigned to other D2D pairs during the second time slot and the sounding signal received from the eNB during the second time slot.

21. A method for operating a user equipment (UE) device, comprising:

receiving allocations of time-frequency resources for D2D (device-to-device) communications from an eNB (evolved node B) and establishing a D2D communications session with a second UE over a D2D link;

receiving from the eNB an assigned measurement time-frequency resource and receiving assigned first and second time slots;

when acting as a D2D transmitter, transmit in a first time slot using the assigned measurement time-frequency resource a sounding signal at a specified power level to the second UE acting as a D2D receiver;

receive a reverse sounding signal from the second UE transmitted in a second time slot using the assigned measurement time-frequency resource, wherein the reverse sounding signal has encoded within it an SINR (signal-to-noise-plus-interference ratio) of the signal received by the second UE during the first time slot;

receive reverse sounding signals sent by one or more D2D receivers belonging to other D2D pairs in the second time slot using their allocated time-frequency resources and measure the signal power in those time-frequency resources in order to determine the interference that would be imposed on the one or more D2D receivers of other D2D pairs were time-frequency resources to be shared with those D2D pairs;

calculate a transmit power level for D2D communications with the second UE that satisfies an SINR required by the second UE and does not impose interference on the one or more D2D receivers of other D2D pairs above a specified threshold.

22. The method of claim 21 further comprising:

when acting as a D2D receiver, receiving a sounding signal from the second UE, acting as a D2D transmitter, over the assigned measurement time-frequency resource in the first time slot, and, if the signal quality of the sounding signal received from the second UE meets a specified threshold, transmitting a reverse sounding signal to the second UE in the second time slot using the same assigned measurement time-frequency resource.

23. The method of claim 22 further comprising adjusting the transmit power used to transmit to the second UE to meet a specified interference temperature constraint.

24. The method of claim 23 further comprising receiving the specified interference constraint via the sounding signal received from the eNB during the second time slot.

25. The method of claim 22 further comprising:

measuring the signal power of a sounding signal received from the eNB during the second time slot using a time-frequency resource orthogonal to the assigned measurement time-frequency resource and to the measurement time-frequency resources assigned to other D2D pairs; and adjusting the transmit power used to transmit to the second UE in relation to the signal powers of the signals received from the other UEs in the measurement time-frequency resources assigned to other D2D pairs and the eNB in the second time slot.

* * * * *